(12) United States Patent
Roussel et al.

(10) Patent No.: US 9,321,883 B2
(45) Date of Patent: Apr. 26, 2016

(54) BIOBASED ALKYD RESIN AND PROCESS FOR MANUFACTURING SUCH AN ALKYD RESIN

(71) Applicants: A ET A MADER, Lille (FR); ROQUETTE FRERES, Lestrem (FR)

(72) Inventors: Joël Roussel, Moriere-les-Avignon (FR); Clothilde Buffe, Lomme (FR); Laura Crowther-Alwyn, Grenoble (FR); Arnaud Verraes, Wavrin (FR)

(73) Assignees: A ET A MADER, Lille (FR); ROQUETTE FRERES, Lestrem (FR)

( * ) Notice: Subject to any disclaimer, the term of this patent is extended or adjusted under 35 U.S.C. 154(b) by 0 days.

(21) Appl. No.: 14/373,904

(22) PCT Filed: Feb. 1, 2013

(86) PCT No.: PCT/FR2013/050212
§ 371 (c)(1),
(2) Date: Jul. 23, 2014

(87) PCT Pub. No.: WO2013/114052
PCT Pub. Date: Aug. 8, 2013

(65) Prior Publication Data
US 2015/0031828 A1     Jan. 29, 2015

(30) Foreign Application Priority Data
Feb. 2, 2012 (FR) ..................... 12 50987

(51) Int. Cl.
| C08G 63/60 | (2006.01) |
| C08G 63/00 | (2006.01) |
| C08G 63/48 | (2006.01) |
| C09D 5/02 | (2006.01) |
| C08G 63/672 | (2006.01) |
| C09D 167/08 | (2006.01) |

(52) U.S. Cl.
CPC .............. *C08G 63/48* (2013.01); *C08G 63/672* (2013.01); *C09D 5/02* (2013.01); *C09D 167/08* (2013.01); *C08G 2150/00* (2013.01)

(58) Field of Classification Search
None
See application file for complete search history.

(56) References Cited

U.S. PATENT DOCUMENTS

2011/0281972 A1    11/2011    Beccaria et al.

FOREIGN PATENT DOCUMENTS

| CA | 2175534 | | 11/1996 |
| WO | 2011051612 A1 | | 5/2011 |
| WO | WO 2011/058130 | * | 5/2011 |
| WO | 2012005645 A1 | | 1/2012 |

OTHER PUBLICATIONS

Van Haveren J. et al., Resins and additives for powder coatings and alkyd paints, based on renewable resources, J. Coat. Technol. Res., 4 (2) 177-186, Jun. 1, 2007.

* cited by examiner

*Primary Examiner* — Susannah Chung
*Assistant Examiner* — Robert T Butcher
(74) *Attorney, Agent, or Firm* — Bookoff McAndrews, PLLC

(57) ABSTRACT

The object of a present invention is an alkyd resin as well as the method for preparing such a resin, said alkyd resin comprising:
- a preferably biosourced, polyacid component or its preferably biosourced acid anhydride;
- a first polyol component, preferably biosourced, having at least two hydroxyl groups;
- a second biosourced polyol component having at least one 1,4:3,6-dianhydrohexitol unit; and
- a component based on biosourced oil or its corresponding biosourced fatty acid.

19 Claims, No Drawings

BIOBASED ALKYD RESIN AND PROCESS FOR MANUFACTURING SUCH AN ALKYD RESIN

The present invention generally relates to alkyd resins derived at least partly from biosourced components as well as to methods for making such resins.

The present invention also relates to the formulation of such resins in the form of aqueous emulsions, paint compositions or formulations.

By alkyd resin, in the present text, is meant a polyester modified with oils and/or fatty acids.

By biosourced, in the present text, is designated any component of plant or animal origin.

Conventional alkyd resins are formulated with volatile organic solvents of fossil origin and noxious for humans and/or the environment (such as white spirit, xylene, naphtha solvent). Further alkyd resins are synthesized from raw materials of fossil origin, i.e. stemming from the petrochemical or carbochemical industry, in particular from organic acids of petroleum origin (especially based on phthalic anhydride).

Efforts have been made for proposing aqueous emulsion of alkyd resins comprising no or very little volatile organic compounds.

Thus, there exists a constant need for reducing or even suppressing compounds which are noxious to humans and/or the environment used in the synthesis of these alkyd resins and in aqueous emulsions comprising such resins, notably when they are used for paint formulations intended for the general public, while meeting the set requirements, in particular as regards the rapid drying of the paint or further the hardness of the film formed.

Moreover, the application of the raw materials used for the synthesis of alkyd resins or their formulation contributes to the increase in the greenhouse effect. Given the decrease in the world's oil reserves, the source of these raw materials will gradually run out.

Raw materials derived from the biomass are a renewable source and have a reduced impact on the environment. They do not all require costly energy-intensive steps for refining petroleum products. The production of $CO_2$ is reduced so that they contribute less to climate change.

Therefore, it appears necessary to have synthesis methods non-dependent on raw materials of fossil origin, but rather using raw materials of renewable origin and notably biosourced.

For this purpose, document WO 2011/051612 proposes an alkyd resin at least partly prepared from biosourced components and the preparation as an aqueous emulsion of such a resin with an emulsifying agent of natural or fossil origin.

The various described formulations apply one or two polyacids, in particular a fatty acid and/or adipic acid dimer, a component based on sunflower oil, a single polyol, in particular glycerol or sorbitol, and a polycondensation catalyst (Ca(OH)$_2$).

The applicant was able to observe that the described alkyd resins, as for some of them, have high viscosity (the dynamic viscosity is comprised between 10 and 50 poises at 80° C.), as for others, a delicate synthesis. Indeed, if the example 10 described in WO 2011/051612 is reproduced, the formation of a deposit related to the use of the succinic acid/glycerol pair is observed, which deposit is insoluble and infusible in a significant amount making the preparation of an emulsion from this resin impossible. Generally, the final properties obtained in paint films made with these resins do not meet the standard requirements of the decorative paint market (these requirements are notably discussed again on page 13 of the present text with regard to the reference designated under the term of synolac 6865).

WO 2012/005645 is also known, the object of which is an alkyd resin which is obtained by subjecting a basic composition comprising at least one polycarboxylic acid; at least one polyalcohol component and at least one monocarboxylic acid or its corresponding triglyceride, to one or several esterification reactions or transesterifications. Among the five described exemplary embodiments, the lowest proportion of furanic acid (FDCA) corresponds to Example 3 in which the alkyd resin comprises of more than 14% by moles of FDCA.

US 2011/0281972 is also known, describing a composition for obtaining a polyester resin intended to be applied for electrostatic powder spraying. In the exemplary embodiments a) to h), described in Table 1, polyacids are used which comprise a ring, such as terephthalic or isophthalic acid or further CHDA. Examples a) to h) all comprise more than 30% by moles of a polyacid comprising a ring. Also, Examples 1 and 2 illustrated in Table 3 comprise isophthalic and terephthalic acid for more than 40% by moles of polyester resin.

The present invention precisely seeks to limit, or even suppress the use of cycloalkyl or aromatic polyacid(s) in obtaining an alkyd resin while having similar film-forming, hardness and abrasion resistance properties, or even better, than those obtained for alkyd resins based on terephthalic acid or on isophthalic acid.

The object of the present invention is also an alkyd resin, at least partly biosourced or even completely biosourced, easy to emulsify.

The object of the present invention is also a paint formulation based on an alkyd resin, at least partly biosourced, having fast drying properties, hardness properties of the formed film, humid abrasion resistance properties, rheological and physical stability properties, UV radiation resistance properties and the capability of adhering to various supports notably wood and metal, which are comparable or even superior to those obtained with a paint formulation of a solvent-based alkyd resin, for example of the oleoglycerophthalic type.

Thus the object of the present invention according to a first aspect is an alkyd resin, at least partly biosourced, comprising:

a polyacid component, preferably biosourced, or its acid anhydride, preferably biosourced;
a first polyol component, preferably biosourced, having at least two hydroxyl groups;
a second biosourced polyol component having at least one 1,4:3,6-dianhydrohexitol unit;
a component based on a biosourced oil or its corresponding biosourced fatty acid.

The applicant surprisingly noticed that the application of a second polyol component comprising at least one 1,4:3,6-dianhydrohexitol unit, in particular 1,4:3,6-dianhydro-D-sorbitol (isosorbide), gives the possibility of obtaining an alkyd resin having moderate viscosity at room temperature, allowing it to be applied as an aqueous emulsion.

Advantageously, the alkyd resin according to the invention does not comprise any phthalic anhydride, and preferably in a general way no aromatic polyacid or aromatic polyacid anhydride.

Advantageously, the alkyd resin according to the invention comprises less than 10% by moles, still preferably less than 5% by moles of aromatic polyacid(s), cycloalkyl polyacid(s) or of acid anhydride(s) of said polyacids. The alkyd resin according to the invention is optionally free of aromatic polyacid, of cycloalkyl polyacid or of acid anhydride of the latter.

Advantageously, an aromatic polyacid according to the invention is a compound comprising at least two carboxyl groups and an aromatic hydrocarbon ring, said ring comprising from 3 to 13 atoms, preferably from 3 to 10 atoms and still preferably from 3 to 6 atoms, in particular of carbon and optionally one or several hetero-atoms, in particular selected from O, S and N. The aromatic ring may thus be a benzene, furane, pyrrole, thiophene or further naphthalene ring.

Advantageously, a cycloalkyl polyacid according to the invention is a compound comprising at least the two carboxyl groups and a saturated hydrocarbon ring natively comprising from 3 to 10 carbon atoms, preferably from 3 to 6 carbon atoms, such as cyclopropyl or cyclohexyl.

Advantageously, the percentage by moles of a given component in the alkyd resin is defined by the ratio of the initial number of moles of this compound relatively to the total number of moles of the different compounds initially present for obtaining the alkyd resin.

Preferably, the second biosourced polyol component having at least one 1,4:3,6-dianhydrohexitol unit is 1,4:3,6-dianhydrohexitol alone.

Advantageously, the alkyd resin according to the invention is liquid or able to flow at room temperature [20° C.; 25° C.].

Preferably, the alkyd resin has moderate viscosity, i.e. a dynamic viscosity of less than 2,000 Poises at 20° C., preferably greater than 20 Poises, still preferably the dynamic viscosity is comprised between 20 Poises and 1,000 Poises at 20° C., and still preferably the dynamic viscosity is comprised between 20 Poises and 300 Poises at 20° C. The dynamic viscosities are measured according to the ISO 3219: 1993 standard. Preferentially, the dynamic viscosity of the alkyd resin according to the invention at 80° C. is less than 10 Poises.

For an alkyd resin of a given composition, high dynamic viscosities indicate high average molecular masses and thus, correlatively, good mechanical properties, notably for forming a sufficiently hard and abrasion resistant film of paint. Nevertheless, a too high dynamic viscosity prevents stable dispersion in a solvent phase of the alkyd resin, in particular concerning water, and this to the detriment of the dry extract (% by weight) of the alkyd resin which the emulsion may contain.

Further, it should be noted that a paint formulation should be able to be customarily used at room temperature, generally between 20° C. and 25° C.

Advantageously, it was observed that the alkyd resin has excellent resistance to humid abrasion (cf. tests conducted above).

A non-exhaustive explanation would be that by using a second polyol component it is possible to improve the hardness of the polymeric film obtained at the end of the application of the alkyd resin.

Preferably, the alkyd resin according to the invention comprises between 20% by moles and 70% by moles of a biosourced fatty acid, preferably between 20% by moles and 50% by moles.

As a reminder, a fatty acid (RCOOH) is an either saturated or not carboxylic acid, generally obtained by hydrolysis of fats (notably long chain carboxylic acid esters) and of propane-1,2,3-triol (glycerol), wherein R is a saturated alkyl chain ($C_nH_{2n+1}$) or an unsaturated alkenyl chain ($C_nH_{2n-1}$).

Preferably, the fatty acids according to the invention may be introduced as such or in the form of refined monoglyceride(s) or refined mixture(s) of mono- and/or di- and/or tri-glycerides, in other words in the form of plant and/or animal oil(s).

The hydrolysis of one mole of mono-, di-ou tri-glycéride in basic medium allows the formation of respectively one mole, two moles or three moles of biosourced fatty acid according to the invention.

Preferably, the alkyd resin according to the invention comprises at least 5% by moles of 1,4:3,6-dianhydrohexitol units, preferably at least 10% by moles, advantageously at most 50% by moles, still preferably at most 40%, most preferentially at most 25% by moles of 1,4:3,6-dianhydrohexitol units.

Preferably, the alkyd resin according to the invention comprises at least 5% by moles, preferably at least 10% by moles, and still preferably at most 25% by moles of the first polyol component.

In a sub-alternative, the alkyd resin according to the invention comprises less than 10% by moles, preferably less than 5% by moles, of an aliphatic polyol, or even is polyol-free.

Preferably, the alkyd resin according to the invention comprises at least 10% by moles, preferably at least 20% by moles, advantageously at most 50% by moles and still preferably at most 40% by moles of the polyacid component.

In the present text, by polyacid component is meant any component comprising at least two carboxyl groups (—COOH), advantageously 2 or 3 carboxyl groups (—COON), in particular 2 carboxyl groups (—COOH).

In the present text, by polyol component is meant any component comprising at least two hydroxyl groups (—OH).

Preferably, the first polyol component comprises at least three hydroxyl groups.

It should be noted that a same polyacid or polyol component may be obtained from biosourced components but may also be obtained from components of fossil origin. For example, such is the case of adipic acid or pentaerythritol.

A method allowing identification whether a polyacid, a polyol or a fatty acid is biosourced consists of identifying whether this component comprises carbon $^{14}C$, synonym of the presence of renewable carbon. Indeed, a biosourced component is a component in which the carbon stems from recently bound $CO_2$ (on a human scale) by photosynthesis from the atmosphere. On earth, this $CO_2$ is captured and bound by plants. At sea, this $CO_2$ is captured and bound by bacteria or plankton proceeding with photosynthesis. The carbon $^{14}C$ content of a biosourced component is determined by applying the ASTM D 6866 (ASTM D 6866-06) and ASTM D 7026 (ASTM D 7026-04) standards, preferentially according to the mass spectrometry measurement method described in the ASTM D6866-06 standard ("accelerator mass spectroscopy").

Within the scope of the present invention, by biosourced component including the biosourced polyacid component, the first biosourced polyol component, the second polyol component comprising at least one 1,4:3,6-dianhydrohexitol unit, and the component based on biosourced oil or on its corresponding biosourced fatty acid, is meant any compound comprising at least 1% by weight of renewable carbon, advantageously at least 50%, preferentially at least 90% of renewable carbon.

This definition also applies to the biosourced reactive diluent or to the agents for emulsifying the alkyd resin, mentioned below.

In one alternative, the polyacid component or its acid anhydride is saturated or unsaturated and includes a hydrocarbon chain having at least 2 carbon atoms and at most 36 carbon atoms.

A saturated hydrocarbon chain is formed with carbon and hydrogen atoms bound together in order to form so-called methylene groups —$CH_2$—.

Preferably, the fatty acid(s) include(s) between 12 to 24 carbon atoms.

In one alternative, said at least one 1,4:3,6-dianhydrohexitol unit is selected, alone or as a combination, from: 1,4:3,6-dianhydro-D-sorbitol (isosorbide), 1,4:3,6-dianhydro-D-mannitol (isomannide), and 1,4:3,6-dianhydro-L-iditol (isoidide), preferably 1,4:3,6-dianhydro-D-sorbitol (isosorbide).

In one alternative, the 1,4:3,6-dianhydrohexitol units of the second biosourced polyol component, preferably 1,4:3,6-dianhydro-D-sorbitol (isosorbide) represent at least 5% by moles of said alkyd resin.

The three different isomers (isosorbide, isomannide, isoidide) covered by 1,4:3,6-dianhydrohexitol will together be designated as isohexide in the following of the present text.

Preferably, the second polyol component is an isohexide monomer. Preferably, the isohexide monomer is characterized by a purity of at least 97%, preferably at least 99%. The purity of the constituents of the resin may be measured by the well-known techniques of high performance liquid chromatography (HPLC).

In one alternative, the polyacid component is selected, alone or as a combination, from: succinic acid ($C_4H_6O_4$); adipic acid ($C_6H_{10}O_4$); itaconic acid ($C_5H_6O_4$), azelaic acid, sebacic acid, tartaric acid, citric acid, malic acid, acid anhydrides thereof, natural fatty acid oligomers, and/or mixtures thereof; and notably a fatty acid dimer or trimer of plant and/or animal origin.

In one alternative, the polyacid component or its acid anhydride is selected, alone or as a combination from: adipic acid and/or its acid anhydride, fatty acid oligomers of plant and/or animal origin, in particular a fatty acid dimer of plant and/or animal origin such as PRIPOL 1012 or 1013 marketed by CRODA.

The inventors observed better results with this selection of acids in terms of dynamic viscosity, advantageously comprised between 20 poises (or 2,000 mPa·s) and 2,000 poises (or 200,000 mPa·s), preferably comprised between 20 poises (or 2,000 mPa·s) and 300 poises (or 30,000 mPa·s) at 20° C. according to the ISO 3219: 1993 standard as well as of ease in emulsification and better mechanical properties obtained for the dried polymeric film.

In one alternative, the first polyol component comprises at most six hydroxyl groups. Preferentially, the first polyol component has a number of hydroxyl functions of more than 2.

The inventors noted that beyond six hydroxyl groups, the reaction medium formed by the initial components during the method for making the alkyd resin according to the invention (see below), tended to gel and therefore prevent proper polycondensation of the initial components.

In one alternative, the first polyol component is selected from the following polyols, alone or as a combination: pentaerythritol ($C_5H_{12}O_4$); glycerol ($C_3H_8O_3$); sorbitol ($C_6H_{14}O_6$); erythritol ($C_4H_{10}O_4$). Advantageously, this is pentaerythritol ($C_8H_{12}O_4$), and glycerol ($C_3H_8O_3$), and still preferably pentaerythritol ($C_5H_{12}O_4$).

In one alternative, the component based on biosourced oil or its corresponding fatty acid is selected from drying and/or semi-drying plant and/or animal oils and fatty acids entering the composition of said plant and/or animal oils.

By drying property of an oil is meant its capability of drying in the presence of oxygen of the air, this capability increases with the increase in the number of unsaturations (or double bonds) present in the structure of the oil. The term of drying oil is thus used when the iodine index is greater than 150, semi-drying oil when the iodine index is comprised between 110 and 150 inclusive, and non-drying oil when the iodine index is less than 110. The iodine index Ii corresponds to the mass of halogen expressed in grams and bound on the double bonds present in the structure of the oil.

In one alternative, plant oils and their corresponding fatty acids are selected from soybean oils or fatty acids, sunflower oils or fatty acids, flax oils or fatty acids, tung oils or fatty acids, castor oils or fatty acids, tall oil fatty acid and/or mixtures thereof, preferably from the aforementioned fatty acids, advantageously soybean or flax oil or soybean or flax fatty acids, still more advantageously soybean or flax oil fatty acids, and even more advantageously soybean oil fatty acids, in particular those having a high oleic acid content (advantageously between 24 and 34% by weight) such as the soybean fatty acid marketed by OLEON under the reference name NOURACID® SZ35.

Advantageously, the soybean oil fatty acids comprise acids selected from oleic acid (advantageously between 20% and 30% by weight), linoleic acid (advantageously receive 40% and 70% by weight), α-linolenic acid (advantageously between 2% and 13%), palmitic acid (advantageously between 7% and 18%), stearic acid (preferably between 1% and 8%) and a saturated fatty acids (advantageously between 0.1% and 2% by weight).

Advantageously, the flax oil fatty acids comprise acids selected from α-linolenic acid (advantageously between 45 and 70% by weight), linoleic acid (advantageously between 12% and 24%), oleic acid (advantageously between 10% and 21% by weight), and saturated fatty acids (advantageously between 6% and 18%).

In one alternative, the alkyd resin has an acid index of less than 20 mg KOH/g, preferably less than or equal to 15 mg KOH/g.

Preferably, the acid index is greater than 5 mg KOH/g. In particular, it is comprised between 6 and 13 mg KOH/g.

By acid index, in the sense the present invention, is meant an index characterizing the acidity of the alkyd resin. This index thus corresponds to the number of milligrams of potassium hydroxide required for neutralizing 1 g of alkyd resin sample.

The decrease in the acid index during the polycondensation reaction also gives the possibility of controlling the progression of the esterification reaction and therefore the length of the macromolecular chains of said formed alkyd resin.

In one alternative, the alkyd resin has an oil length comprised between 25 and 75% inclusive, preferably between 40% and 65% inclusive, in particular between 40 and 60%.

By oil length, in the sense the present invention, is meant the oil or fatty acid content, i.e. the fatty acid mass relatively to the mass of all the constituents of the alkyd resin after removing the esterification water.

The object of the present invention, according to a second aspect, is a composition comprising an alkyd resin according to one of the alternative embodiments described above, and a reactive diluent, preferably biosourced.

The object of the present invention, according to a third aspect, is an aqueous emulsion of an alkyd resin comprising from 25% to 60%, advantageously 30% to 50%, by weight of alkyd resin according to one of the alternative embodiments described above, or of the composition described above, and at least one emulsifying agent, preferably of plant or animal origin, preferably in an amount ranging from 0.1% by weight to 1% by weight of the aqueous emulsion, advantageously from 0.3 to 0.7%.

The values (%) by weight indicated hereafter are given based on the total weight of the aqueous emulsion.

In one alternative, the emulsifying agent may be ionic or non-ionic, and is preferably selected alone or as a combination from: alkyl sulfonates, aryl sulfonates, stearates, lecithin, glycerol monoesters, fatty acid monoesters, pentaerythritol esters, sorbitan esters, such as sorbitan mono-oleate or le sorbitan monolaurate, advantageously this is a sorbitan ester, in particular sorbitan monolaurate.

In one alternative, the aqueous emulsion comprises at least one anti-foam agent, preferably in an amount ranging from 0.1% to 2% by weight of said aqueous emulsion, in particular from 0.5 to 1.5% by weight.

In a sub-alternative, the anti-foam agent is selected alone or as a combination from: polysiloxanes, polyoxyethylene and fatty acid esters, polyoxypropylene and fatty acid esters, polyoxyethylene and sorbitan esters such as polyoxyethylene sorbitan monolaurate, advantageously this is a polyoxyethylene and sorbitan ester.

In one alternative, the aqueous emulsion comprises at least one stabilization agent, preferably in a proportion ranging from 0.1% to 8% by weight of said emulsion, advantageously from 1% to 5% by weight.

In a sub-alternative, the stabilization agent is selected alone or as a combination from: modified starches, xanthan gums, guar gums, advantageously these are modified starches such as TACKIDEX® 110UY.

In one alternative, the aqueous emulsion comprises at least one polyfunctional agent having an anti-foam agent function and/or emulsifying agent and/or stabilization agent, preferably in an amount ranging from 0.5% to 8% by weight of said emulsion.

In a sub-alternative, the polyfunctional agent is selected alone or as a combination from: β-cyclodextrins, gum arabic, plant and animal proteins, notably casein and/or gelatin.

Alkyd resins may be emulsified with water in order to form an oil-in-water emulsion.

Generally, the emulsion comprises from 40% to 75% by mass of water and from 25% to 60% by mass of alkyd resin.

In order to form this emulsion, the alkyd resin may be mixed with water and the different aforementioned agents for forming an emulsion. There exist several apparatuses capable of producing an emulsion; from the stirrer to the high pressure homogenizer through the colloid mill and the turbo-emulsifier.

The object of the invention according to a fourth aspect is therefore also a method for making the emulsion according to the invention comprising a step for mixing an oil phase comprising the alkyd resin according to the invention and an aqueous phase.

A method may be carried out in which one passes through a water-in-oil emulsion as described in the application WO 2011/051612. The alkyd resin is then heated and then dispersed in water in order to form an emulsion of the water-in-oil type (W/O). This W/O emulsion will be reversed by adding water in order to form an emulsion of the oil-in-water type (O/W).

Alternatively, it is possible to carry out a method for making the emulsion by a step for direct emulsification of the oil phase in the water phase. This method is made possible by the excellent rheological behavior of the alkyd resin according to the invention.

More particularly, it is possible to directly make an oil-in-water (O/W) emulsion by applying the following steps:
- a first step during which, said alkyd resin is heated to a temperature greater than or equal to 40° C., preferably less than or equal to 90° C. in order to form a mixture A, with stirring, notably by means of a mixing device having a stirring blade rotating at a speed of rotation comprised between 2,000 rpm and 8,000 rpm, optionally with an emulsifying agent;
- a second step during which, a stabilizing agent is mixed with water, and optionally with an anti-foam agent, by heating to a temperature greater than or equal to 40° C., preferably less than or equal to 90° C. in order to form a mixture B;
- a third step during which said mixture A is incorporated into said mixture B, with intense stirring, and notably by means of a device including a stirring blade rotating between 5,000 rpm et 8,000 rpm, preferably the temperature of the A and B mixtures is less than or equal to 60° C., for at least one minute in order to obtain the emulsion of said alkyd resin.

The thereby formed emulsions preferentially have a viscosity ranging from 1,000 cP (or 100,000 mPa·s) to 2,000 centipoises (or 200,000 mPa·s) at 20° C., measured according to the ISO 3219:1993 standard.

The object the present invention, according to a fifth aspect, is a paint formulation comprising a composition as described above or an aqueous emulsion according to one of the alternative embodiments described above.

The paint formulation may also comprise—in a known way—additional agents, notably one or several pigments, such as natural (biosourced) pigments:titanium dioxide, iron oxides, carbon black, weld yellow, pastel blue and madder red; or further synthetic pigments derived from a fossil source: phthalocyanin blue and green, azoic yellow and quinachridone red.

The paint formulation may also comprise fillers, such as calcium carbonates, talcum or silica, beeswax or carnauba wax.

The paint formulation of the invention conventionally contains a drying or semi-drying agent.

It is possible to obtain the paint formulation of the invention by mixing the aqueous emulsion with the additional agents mentioned earlier and optionally with water.

The amounts of fillers and/or pigments are determined according to the desired properties for said formulation.

The object of the present invention, according to a sixth aspect, is a method for preparation of an alkyd resin such as the one described according to one of the alternative embodiments mentioned above, comprising a step for polycondensation of the starting components forming a reaction medium comprising at least one polyacid component, preferably biosourced, or its acid anhydride, preferably biosourced, a first polyol component, preferably biosourced, having at least two hydroxyl groups, a second polyol component comprising at least one 1,4:3,6-dianhydrohexitol unit, a component based on a biosourced oil or on its corresponding biosourced fatty acid, said starting components are dynamically mixed continuously at a temperature comprised between 180° C. and 240° C. until formation of the alkyd resin.

It is advantageous that during the step for polycondensation of the starting components, the actual functionality of the reaction medium should be controlled and preferentially remains less than 2 in order to avoid a risk of gelling of said medium.

By actual functionality of a component, in the sense of the invention, is meant the number of present reactive groups per molecule of this compound (in particular the number of hydroxyl and/or carboxyl groups).

By actual functionality of an alkyd resin, in the sense of the present invention, is meant the average actual functionality of the reaction medium formed by the starting components: F=total number of functional groups used/total number of molecules.

The proportions of the different starting components correspond to those indicated above for the alkyd resin in page 3 and the following pages.

In one alternative, the polycondensation step is carried out without any catalyst for the esterification reaction. This arrangement avoids the use of a catalyst and notably its recycling.

Nevertheless, it is customary for one skilled in the art to use a polycondensation catalyst such as calcium hydroxide [Ca(OH)$_2$] or lithium hydroxide [Li(OH)], in order to accelerate the polycondensation reaction.

In one alternative, the polycondensation's step is carried out in an azeotropic mode, with a solvent, notably xylene, for creating azeotropy, or in a melting mode without any solvent.

The azeotropic mode is mainly used for the synthesis of alkyd resins. It is based on the formation of the water-solvent azeotrope, notably water-xylene. As soon as the water molecules form, they will form an azeotrope with a solvent, notably xylene, which will be carried away into the condenser. And then the vapors condense in the condenser. It is possible to recover the water at the bottom of the circuit, the latter being denser than the solvent, notably xylene.

The solvent which was used for generating azeotropy is removed at the end of synthesis by a distillation operation, i.e. the evaporation of the solvent in vacuo.

The melting mode may also be used even if this circuit is preferentially used for the synthesis of (un)saturated polyester resins.

Preferably, a packing column is integrated between the flask and the Dean Stark device. In the column, the glycols evaporate in the same time as the water but they recondense faster and fall into the flask since their boiling temperature is higher than that of water. Water, as for it, recondenses and falls again into the Dean Stark. It is thus discharged from the flask.

In one alternative, the temperature of the reaction medium during the polycondensation step is gradually raised up to at least 180° C. under a flow of chemically inert gas, in particular nitrogen.

In one alternative, the temperature of the reaction medium during the polycondensation step is maintained for at least two hours between 180° C. and 240° C. until an acid index of less than 20 mg KOH/g of alkyd resin.

In one alternative, at the end of the polycondensation step, the solvent is removed, notably by distillation in vacuo, until the formed alkyd resin has a dry extract at least equal to 97%, preferably greater than or equal to 99% by mass.

The present invention will be better understood upon reading the following exemplary embodiments, mentioned in a nonlimiting way.

The components preferentially used for the synthesis of alkyd resins are:
  the preferred first polyol component comprising at least two hydroxyl groups is pentaerythritol, marketed by PERSTORP, under reference VOXTAR M100, and characterized by a potassium hydroxide index comprise between 1625-1650 mg KOH/gram and a minimum purity of 98.0%. This grade is exclusively of plant origin. It is a polyol compound including a functionality equal to 4. It appears as a white solid.

The second polyol component comprising at least one isohexide unit used is isosorbide, marketed by ROQUETTE under reference POLYSORB® P, the latter being characterized by a minimum purity of 99.5%. Isosorbide is a heterocyclic compound obtained from the dual dehydration reaction of sorbitol, itself stemming from the hydrogenation reaction of glucose. Isosorbide is a diol stemming from agro-ressources, which is non-toxic, biodegradable and thermally stable. It appears as a white hygroscopic solid.

The polyacid components used are:
  PRIPOL 1012 & 1013, which are marketed by CRODA. These are natural fatty acid dimers characterized by high percentages of dimers (minimum of 96%). They appear as a thick liquid.
  Adipic acid is marketed by BASF. It appears as a white solid, and is characterized by a minimum purity of 99.8%.

The fatty acid component used is soybean fatty acid marketed by OLEON under reference NOURACID® SZ35. It appears as a thick liquid. It is characterized by an oleic acid content (C18:1 mono-unsaturated fatty acid) comprise between 24% and 34%.

I—EXPERIMENTAL PART

1—Example 1 in a 0.5 liter reactor equipped with a mechanical stirrer, a temperature probe, a supply of nitrogen, a decanter surmounted with a condenser and a sampling connection, are introduced at room temperature:
  161.54 g of soybean fatty acid;
  21.08 g of isosorbide;
  164.18 g of PRIPOL 1012;
  39.24 g of pentaerythritol;
  13.96 g of xylene.

The temperature of the reaction medium is then gradually raised up to 220° C. under a flow of nitrogen. This temperature is maintained for six hours until an acid index of less than 20 mg KOH/gram of resin is attained. At the end of the reaction, the xylene is then removed by distillation in vacuo until a dry extract greater than or equal to 99% is obtained. At the end of the reaction, we obtain an alkyd resin appearing as a viscous liquid.

The characteristics of the non-diluted alkyd resin obtained are:
  an acid index of 9.5 mg KOH/g (ISO 3682);
  a dry extract of 99.1% (ISO 3251);
  a discontinuity of 116 poises at 20° C. or 83 poises at 25° C. (ISO 3219:1993);
  an oil length of 44%;
  an actual functionality of 1.50.

2—Example 2:

in a 2 liter reactor equipped with a mechanical stirrer, a temperature probe, a supply of nitrogen, a decanter surmounted with a condenser and a sampling connection, are introduced at room temperature:
  916.50 g of soybean fatty acid;
  238.96 g of isosorbide;

358.44 g of adipic acid;
222.47 g of pentaerythritol;
63.63 g of xylene.

The temperature of the reaction medium is then gradually raised to 220° C. under a flow of nitrogen. This temperature is maintained for 8 hours until an acid index of less than 20 mg KOH/gram of resin is obtained. At the end of the reaction, the xylene is then removed by distillation in vacuo until a dry extract greater than or equal to 99% is attained. An alkyd resin is then obtained appearing as a viscous liquid.

The characteristics of the non-diluted alkyd resin obtained (designated under the terms of alkyd resin A) are:
an acid index of 10.5 mg KOH/g (ISO 3682);
a dry extract of 99% (ISO 3251);
a viscosity of 340 poises at 20° C. (ISO 3219:1993);
an oil length of 58%;
an actual functionality of 1.82.

Table 1 below describes the proportions (grams) of the different components entering the synthesis of seven examples of an alkyd resin according to the invention.

For the synthesis of Examples 3 to 9, the different components indicated in Table 1 were incorporated into a reactor with a determined volume, able to receive the whole of the starting components, equipped with a mechanical stirrer, with a temperature probe, with a supply of nitrogen, a decanter surmounted with a condenser and a sampling connection. The temperature of the reaction medium was then gradually raised up to 220° C. under a flow of nitrogen. This temperature is maintained for six hours until an acid index of less than 20 mg KOH/gram of resin is obtained. At the end of the reaction, the xylene is then removed by distillation in vacuo until a dry extract greater than or equal to 99% is attained. At the end of the reaction, we obtain an alkyd resin appearing as a viscous liquid. The acid indexes,
the viscosities and the obtained dry extracts for Examples 3 to 9 are indicated at the bottom of Table 1.

II—Evaluation of the Alkyd Resin A Obtained at the End of Example 2.

The alkyd resin made from isosorbide and adipic acid was dispersed in white spirit in order to test it in a first phase in a glycerol paint in the solvent phase of the market (Synolac 6865/Leaderlaque blanc (1008614) designated under the term of control formula), with the same additives and this in the same proportions (pigments, fillers, . . . ) described in Table 2 hereafter.

The characteristics of the diluted alkyd resin A are the following:

dry extract: 70%±2—viscosity: 1,900±400 mPa·s—oil length: 58%—density: 0.94 ±0.02.

TABLE 2

| Raw materials | Control paint (Synolac 6865/ Leader Laque Blanc) % by weight of the total weight of the paint | Biosourced diluted alkyd A paint |
|---|---|---|
| White Spirit solvent | 27.4% | 27.4% |
| Wetting agent | 0.45% | 0.45% |
| Thickener | 0.5% | 0.5% |
| Titanium | 30% | 30% |
| Fillers | 7.3% | 7.3% |
| SYNOLAC 6865 | 32.5% | / |
| DILUTED ALKYD A | / | 32.5% |
| Anti-skin agent | 0.3% | 0.3% |
| Drying agent | 1.55% | 1.55% |

TABLE 1

| Alkyd resin according to the invention | Example 3 | Example 4 | Example 5 | Example 6 | Example 7 | Example 8 | Example 9 |
|---|---|---|---|---|---|---|---|
| Adipic acid mass (g) | 0 | 358.44 | 250.64 | 280.62 | 0 | 0 | 282.74 |
| Soybean fatty acid mass (g) | 161.54 | 916.5 | 640.92 | 1076.4 | 753.63 | 430.88 | 0 |
| Flax fatty acid mass (g) | 0 | 0 | 0 | 0 | 0 | 0 | 774.62 |
| Fatty acid dimer mass (g) | 164.18 | 0 | 0 | 0 | 765.74 | 525.37 | 0 |
| Isosorbide mass (g) | 21.08 | 238.96 | 167.1 | 187.02 | 98.28 | 89.87 | 201.95 |
| Pentaerythritol mass (g) | 39.24 | 222.47 | 0 | 174.24 | 0 | 83.71 | 188.12 |
| Glycerol mass (g) | 0 | 0 | 105.29 | 0 | 123.85 | 28.31 | 0 |
| Xylene mass (g) | 13.96 | 63.63 | 36.05 | 81.72 | 58.5 | 41.86 | 52.56 |
| Final acid index (mg KOH/g) | 9.5 | 10.5 | 17 | 12 | 13 | 11 | 14 |
| Viscosity (20° C., poises) | 116 | 340 | 20 | 24 | 27 | 123 | 31 |
| Dry extract (%) | 99.1 | 99 | 99 | 99 | 99 | 98 | 98 |

The results of the tests carried out appear in Table 3 below:

| Characteristics | Standards | Tolerance | Control formula (Synolac 6865) | Alkyd resin A |
|---|---|---|---|---|
| Density | NF EN ISO 2811-1 | 1.28/1.34 | 1.31 | 1.28 |
| Persoz hardness (7 d) | NF EN ISO 1522 | | 62 s | 53 s |
| Persoz hardness (21 d) | NF EN ISO 1522 | | 80 s | 57 s |
| Fineness | NF EN ISO 1524 | >8 | 8.5 | 8.5 |
| Viscosity ku | NF EN ISO 2884-1 | 110/120 ku | 105 ku | 106 ku |
| Run | 410MDT020 | >150 μm | 200 μm | >300 μm |
| Brightness 60° (specular reflection) | NFT 30-064 | >80% | 87% | 82.50% |
| Sedimentation | 410MDT038 | ok | ok | ok |
| HP drying | NF EN ISO 3678 | <7 h | 7 h | 9 h |
| HT drying | NF EN ISO 3678 | <7 h | 11 h | 12 h |
| Adherence to wood | NF EN ISO 2409 | | Class 1 | Class 0 |
| Humid abrasion* 5,000 cycles | NF EN ISO 11998 | | 4.03 g/m² 1.90 μm | 3.90 g/m² 1.80 μm |
| Hue (difference from the standard) | | | Reference | ΔE = 0.35 ΔL = −0.06 Δa = −0.16 Δb = 0.24 |
| Applicability | | | Nothing worth mentioning | Ropy finish tendency |
| QUV 100 h | NF EN ISO 11507 | | ΔE = 2.70 brightness loss 60% | ΔE = 1.70 brightness loss 56% |
| QUV 250 h | NF EN ISO 11507 | | ΔE = 2.70 brightness loss 60% | ΔE = 1.70 brightness loss 56% |

The paint based on alkyd resin A has similar performances to those obtained with the standard formula in terms of drying rapidity, adherence, humid abrasion resistance and light fastness. However a lower Persoz hardness is noted after 3 weeks of drying.

III—Emulsification of Alkyd Resin A

The alkyd resin A is first of all mixed with stirring (notably at a rate of about 4,000 rpm) by means of an Ultra-turrax with SPAN 80® at a temperature greater than or equal to 40° C., in particular of the order of 60° C. in order to form a mixture A. In a stainless steel bowl, a water is mixed with the anti-foam agent TWEEN® 80 four at least one minute, with stirring (about 4,000 rpm), and then the stabilizing agent TACKIDEX® 110UY is added for forming the mixture B.

The mixture A is incorporated into the mixture B, with stirring, by controlling the temperature, in particular by keeping a temperature greater than or equal to 40° C., notably of the order of 60° C. The stirring of the mixture is brought to 6,400 rpm, and the mixture is then stirred for 30 seconds at a rate of 10,000 rpm in order to return to 6,400 rpm.
The products used for preparing the emulsion described above are
  the bulk alkyd resin obtained at the end of Example 2,
  tap water
  a stabilizer: modified starch TACKIDEX® 110UY
  an anti-foam agent: polyoxyethylene sorbitan monolaurate TWEEN® 80
  an emulsifier: sorbitan monolaurate SPAN 80®
Formulation of the emulsion in weight % based on the total weight of the emulsion,

TABLE 4

| | |
|---|---|
| Water | 50% |
| Tackidex 110UY | 2.5% |
| Alkyd resin (Example 2) | 45% |
| Tween 80 | 1% |
| Span 80 | 0.5% |
| TOTAL | 100% |

The thereby obtained emulsion is then centrifuged by means of a centrifuge (4,000 rpm) for 5 minutes. At the end of the tests, no phase separation is observed which means that the formed emulsion is stable.

IV—Evaluation of The Alkyd Resin a Emulsified According to The Method Described In Paragraph III.

1—As Compared with a Non-Biosourced Aqueous Emulsion Available on the Market (URADIL AZ 60®)

The aqueous emulsion of the alkyd resin A, emulsified according to the method described above in paragraph III, was compared with an aqueous emulsion of a non-biosourced standard paint (also based on an alkyd resin) intended for coating wood or iron (marketed under the brand of URADIL AZ 760® byr DSM®). Paints based on URADIL AZ 760 and on the emulsion of the alkyd resin A comprise the same formulations in terms of the nature and of the proportions of the additives (fillers, pigments, . . .) described hereafter in Table 4.

of alkyd resin A comprise the same formulations in terms of the nature and of the proportions of the additives (fillers, pigments, . . . ) described hereafter in Table 6.

TABLE 5

| Raw materials in % by weight of the total weight of the paint | Non-biosourced control paint | Biosourced Alkyd A emulsion paint |
|---|---|---|
| Water | 28.9% | 28.9% |
| Wetting agent | 1% | 1% |
| Thickener | 2.8% | 2.8% |
| Anti-foam agent | 0.4% | 0.4% |
| Titanium | 20% | 20% |
| Fillers | 1.5% | 1.5% |
| URADIL AZ 760 | 44% | / |
| BIOSOURCED ALKYD A EMULSION | / | 44% |
| Spreading agent | 0.5% | 0.5% |
| Drying agent | 0.5% | 0.5% |
| Preservative | 0.2% | 0.2% |
| Antiflash rusting agent | 0.2% | 0.2% |

The results appear in Table 6 below:

| Characteristics | Standards | Tolerances | URADIL AZ 760 | Aqueous alkyd A resin emulsion |
|---|---|---|---|---|
| Density | NF EN ISO 2811-1 | 1.20/1.26 | 1.24 | 1.25 |
| Persoz hardness (48 h) | NF EN ISO 1522 | | 54 s | 56 s |
| Fineness | NF EN ISO 1524 | 8/10 | 8 | 8 |
| Visco ku | NF EN ISO 2884-1 | 130/135 ku | 115 ku | 107 ku |
| pH | NF EN ISO 787-9 | 7/8 | 7.9 | 7.5 |
| Run | 410MDT020 | >200 μm | 200 μm | 250 μm |
| Hue L | | | 95.78 | 94.81 |
| A | | | −0.88 | −1.11 |
| B | | | 2.15 | 3.33 |
| Stability/Sedimentation | | | compliant | compliant |
| Thickness (dry) | | | 70 μm | 70 μm |
| HT drying | NF EN ISO 3678 | <10 h | 5 h | 8 h |
| Adherence to wood | NF EN ISO 2409 | Class 0/1 | Class 0 | Class 0 |
| Adherence to steel | NF EN ISO 2409 | Class 0/1 | Class 3 | Class 1 |
| Humid abrasion | NF EN ISO 11998 | <20 μm | 0.5 μm | 14 μm |

The results obtained from the emulsion of the alkyd resin A are interesting. Indeed, the latter is stable, no time-dependent change in the viscosity or the phase separation of the paint was noticed.

The characteristics of the obtained film are compliant in terms of drying and adherence (on steel and wood), as well as regards humid abrasion resistance.

2—As Compared with a Biosourced Aqueous Emulsion Available on the Market GEOPUR MAT® (Marketed by CAMI-GMC)

The aqueous emulsion of the alkyd resin A, emulsified according to the method described above in paragraph III, was compared with an aqueous emulsion of a biosourced standard paint (also based on an alkyd resin: GEOPUR MAT). Paints based on GEOPUR MAT and on the emulsion

TABLE 7

| Raw materials | Biosourced control paint GEOPUR MAT | Biosourced alkyd A emulsion paint |
|---|---|---|
| Water | 25.55% | 25.55% |
| Wetting agent | 1% | 1% |
| Thickener | 3.35% | 3.35% |
| Anti-foam agent | 1% | 1% |
| Titanium | 20% | 20% |
| Fillers | 27.5% | 27.5% |
| BIOSOURCED EMULSION GEOPUR MAT | 20% | / |
| BIOSOURCED ALKYD A EMULSION | / | 20% |
| Co-solvent | 1% | 1% |
| Drying agent | 0.5% | 0.5% |
| Preservative | 0.1% | 0.1% |

The results appear in Table 8 below:

| Characteristics | Standards | GEOPUR MAT | Aqueous alkyd resin A emulsion |
|---|---|---|---|
| Density | NF EN ISO 2811-1 | 1.53 | 1.36 |
| Persoz hardness (7 days) | NF EN ISO 1522 | 36 s | 47 s |
| Fineness | NF EN ISO 1524 | 8 | 8 |
| Viscosity ku | NF EN ISO 2884-1 | 133 ku | 117 ku |
| Run | 410MDT020 | 500 μm | 450 μm |
| Brightness 60° | NFT 30-064 | 2.30% | 2.20% |
| Sedimentation 1 month 20° C. | 410MDT038 | ok | ok |

-continued

| Characteristics | Standards | GEOPUR MAT | Aqueous alkyd resin A emulsion |
|---|---|---|---|
| HP drying | NF EN ISO 3678 | 30 mins | 30 mins |
| HT drying | NF EN ISO 3678 | 30 mins | 30 mins |
| Adherence to wood | NF EN ISO 2409 | Class 5 | Class 1 |
| Applied thickness | | 70 μm | 70 μm |
| Humid abrasion | NF EN ISO 11998 | Disappearance of paint | 82 g/m² 50 μm |

As compared with the biosourced paint of the market, GEOPUR MAT, the biosourced formula according to the invention has better resistance to humid abrasion in spite of a strong degradation of the film after 5,000 cycles with a hard brush, as well as better adherence on wood. It is actually observed that the control paint film GEOPUR has totally disappeared at the end of the humid abrasion test while the film obtained with the alkyd resin A according to the invention is still present at the end of the test.

The other characteristics are substantially identical with those of GEOPUR.

As a conclusion, the alkyd resin according to the invention has improved properties notably allowing it to be formulated in a paint and to meet the requirements notably as regards drying rapidity, hardness of the film formed, humid abrasion resistance, rheological and physical stability of the paint, UV resistance, or further its capability of adhering to various supports, notably wood and metal, comparable or even superior to those obtained for a paint formulation based on an alkyd resin with a solvent.

The invention claimed is:

1. An alkyd resin, comprising:
  a polyacid component or its acid anhydride; a first polyol component having at least two hydroxyl groups; a second polyol component which is a biosourced polyol component having at least one 1,4:3.6-dianhydrohexitol unit; and a biosourced oil component or its biosourced corresponding fatty acid;
  wherein the alkyd resin comprises less than 10% by mole of aromatic polyacids(s) and cycloalkyl polyacid(s) or acid anhydride(s) of said aromatic polyacid(s) and cycloalkyl polyacids(s), relative to a sum of moles of the polyacid component or its acid anhydride, the first polyol component, the second polyol component, and the biosourced oil component or its biosourced corresponding fatty acid.

2. The alkyd resin according to claim 1, wherein said at least one 1,4:3,6-dianhydrohexitol unit is selected, alone or as a combination, from: 1,4:3,6-dianhydro-D-sorbitol, 1,4:3,6-dianhydro-D-mannitol, and 1,14:3,6-dianhydro-L-iditol.

3. The alkyd resin according to claim 1, wherein the 1,4:3,6-dianhydrohexitol units of the second polyol component account for at least 5% by mole of said alkyd resin.

4. The alkyd resin according to claim 1, wherein the polyacid component is selected, done or as a combination, from: succinic acid; adipic acid; itaconic acid, azelaic acid, sebacic acid, tartaric acid, citric acid, malic acid, and the acid anhydrides and/or their mixtures; oligomers of a fatty acid of plant origin and a dimer or trimer of a fatty acid of plant origin.

5. The alkyd resin according to claim 1, wherein the first polyol component is selected from the following polyols, alone or as a combination: penfaerythrital; glycerol; sorbitol; erythritol.

6. The alkyd resin according to claim 1, wherein the component based on biosourced oil or its biosourced corresponding fatty acid is drying and/or semi-drying plant oils or their corresponding fatty acids selected from: soybean oils or fatty acids, sunflower oils or fatty acids, flax oils or fatty acids, tung oils or fatty acids, castor oils or fatty acids, tall oil fatty acids and/or mixtures thereof.

7. The alkyd resin according to claim 1, wherein the alkyd resin has an acid index of less than 20 mg KOH/g.

8. The alkyd resin according to claim 1, wherein the alkyd resin has an oil length that is greater than or equal to 25% and less than or equal to 75%.

9. A composition comprising an alkyd resin according to claim 1, and a reactive diluent.

10. An aqueous emulsion of an alkyd resin comprising from 25% to 60% by weight of alkyd resin according to claim 1, and at least one emulsifying agent.

11. A paint formulation comprising an alkyd resin according to claim 1.

12. A method for preparing an alkyd resin according to claim 1, the method comprising a step for polycondensation of starting components forming a reaction medium comprising at least one polyacid component or its acid anhydride, one first polyol component having at least 2 hydroxyl groups, a second polyol component comprising at least one 1,4:3,6-dianhydrohexitol unit, a biosourced oil component or its biosourced corresponding fatty acid, said starting components being mixed at a temperature between 180° C. and 240° C., wherein the reaction medium comprises less than 10% by mole, based on a total number of moles of the starting components, of aromatic polyacid(s), cycloalkyl polyacid(s) or acid anhydride(s) of said polyacids.

13. The preparation method according to claim 12, wherein the temperature of the reaction medium during the polycondensation step is maintained for at least two hours between 180° C. and 240° C. until an acid index of less than 20 mg KOH/g of the alkyd resin is attained.

14. A method of preparing an aqueous emulsion of the alkyd resin according to claim 1, the method comprising the following steps:
  a first step during which said alkyd resin is heated to a temperature greater than or equal to 40° C. in order to form a mixture A, with stirring;
  a second step during which a stabilizing agent is mixed with water, by heating to a temperature greater than or equal to 40° C. in order to form a mixture B;
  a third step during which said mixture A is incorporated in to said mixture B, with strong stirring, necessary by means of a device including a stirring blade rotating between 5,000 revolutions/min and 8,000 revolutions/min, for at least one minute in order to obtain the emulsion of said alkyd resin.

15. The alkyd resin according to claim 1, wherein the alkyd resin has an acid index of less than 15 mg KOH/g.

16. The alkyd resin according to claim 1, wherein the alkyd resin has an oil length that is higher than or equal to 40% and lower than or equal to 65%.

17. A composition comprising an alkyd resin according to claim 1, and a reactive biosourced diluent.

18. An aqueous emulsion of an alkyd resin comprising from 25% to 60% by weight of the composition according to claim 17, and at least one emulsifying agent.

19. A paint formulation comprising an aqueous emulsion according to claim 10.

* * * * *

UNITED STATES PATENT AND TRADEMARK OFFICE
CERTIFICATE OF CORRECTION

PATENT NO. : 9,321,883 B2
APPLICATION NO. : 14/373904
DATED : April 26, 2016
INVENTOR(S) : Joël Roussel et al.

It is certified that error appears in the above-identified patent and that said Letters Patent is hereby corrected as shown below:

In the Claims

In claim 1, col. 17, line 40, should read --1,4:3,6-- rather than "1,4:3.6";
    line 44, should read --polyacid(s)-- rather than "polyacids(s)"; and
    line 46, should read --polyacid(s)-- rather than "polyacids(s)".

In claim 2, col. 17, line 54, should read --1,4:3,6-- rather than "1,14:3,6".

In claim 4, col. 17, line 59, should read --alone-- rather than "done".

In claim 5, col. 17, line 66, should read --pentaerythritol-- rather than "penfaerythrital".

In claim 16, col. 18, line 57, should read --greater-- rather than "higher"; and
    line 58, should read --less-- rather than "lower".

Signed and Sealed this
Twenty-eighth Day of June, 2016

Michelle K. Lee
*Director of the United States Patent and Trademark Office*